United States Patent
Filsinger et al.

(10) Patent No.: US 8,142,583 B2
(45) Date of Patent: Mar. 27, 2012

(54) METHOD FOR PRODUCTION OF SEVERAL FIBRE COMPOSITE COMPONENTS

(75) Inventors: Juergen Filsinger, Feldkirchen-Westherham (DE); Franz Maidl, Wallerfing (DE); Andreas Gessler, Haar (DE); Marinus Schouten, Horstedt (DE)

(73) Assignee: Airbus SAS, Blagnac (FR)

( * ) Notice: Subject to any disclaimer, the term of this patent is extended or adjusted under 35 U.S.C. 154(b) by 324 days.

(21) Appl. No.: 12/375,828

(22) PCT Filed: Jul. 3, 2007

(86) PCT No.: PCT/EP2007/005856
§ 371 (c)(1),
(2), (4) Date: May 1, 2009

(87) PCT Pub. No.: WO2008/014858
PCT Pub. Date: Feb. 7, 2008

(65) Prior Publication Data
US 2009/0311487 A1 Dec. 17, 2009

(30) Foreign Application Priority Data
Jul. 31, 2006 (DE) .......................... 10 2006 035 939

(51) Int. Cl.
*B29C 70/54* (2006.01)
*B29C 70/30* (2006.01)

(52) U.S. Cl. .......... 156/60; 156/148; 156/169; 156/182; 156/172; 156/166

(58) Field of Classification Search ...................... 156/60
See application file for complete search history.

(56) References Cited

U.S. PATENT DOCUMENTS

| 4,512,835 A * | 4/1985 | Gardiner ........................ 156/174 |
| 2001/0015510 A1 * | 8/2001 | Nakamura ..................... 264/159 |
| 2001/0031350 A1 * | 10/2001 | Day et al. ................... 428/317.9 |
| 2007/0152105 A1 | 7/2007 | Filsinger et al. |

FOREIGN PATENT DOCUMENTS

| DE | 601 01 638 | 6/2004 |
| DE | 103 26 422 | 1/2005 |
| DE | 10326422 A1 * | 1/2005 |
| EP | 0 069 539 | 1/1983 |
| EP | 1 122 052 A2 | 8/2001 |
| EP | 1122052 A2 * | 8/2001 |
| EP | 1 798 428 | 6/2007 |
| FR | 2 760 397 | 9/1998 |

* cited by examiner

Primary Examiner — Philip Tucker
Assistant Examiner — Vicki Wu
(74) Attorney, Agent, or Firm — Oblon, Spivak, McClelland, Maier & Neustadt, L.L.P.

(57) ABSTRACT

A method for production of fiber composite components, particularly suitable for the production of profiles of complicated shape with varying profile cross-section and/or with at least parts with curved lines, such as used for the production of aircraft, for example. The method (a) produces plural core components, (b) separates application of a first fiber material to each of the core components, (c) assembles the core components provided with the first fiber material to form a sequence of core components, (d) applies a second fiber material common to the core component sequence along at least one side of the core component sequence, provided with the first fiber material, (e) impregnates and hardens the first and second fiber materials to form a fiber-reinforced component body, and (f) separates the component body into plural sections as represented by the fiber composite components.

10 Claims, 4 Drawing Sheets

METHOD FOR PRODUCTION OF SEVERAL FIBRE COMPOSITE COMPONENTS

BACKGROUND OF THE INVENTION

1. Field of the Invention

The present invention relates to a method for production of fiber-composite structural elements.

2. Discussion of the Background

The use of fiber-composite structural elements is interesting for many areas of application, in particular because of their high specific strength (ratio of strength to weight). A fiber-composite material is a mixed material that is generally composed of two main components, namely a matrix and fibers embedded therein. Mutual interactions of these components endow the material with higher-performance characteristics than those of the two individual components involved.

In particular, the present invention relates to the production of highly stressed profile sections having more or less complicated geometry. According to prior art based on internal industrial know-how of the Applicant, carbon-fiber-reinforced plastic profile sections, for example, are mostly produced at present either in prepreg technology or by draping semifinished textile products (woven and nonwoven fabrics, fiber mats, etc.) of carbon fibers. However, this requires a relatively large amount of manual labor. In the production of curved profile sections, the cutting loss is typically as high as 50%.

The only manufacturing process known to date to be more streamlined with a small percentage of waste for the production of carbon-fiber-reinforced plastic profile sections is pultrusion. However, only straight profile sections with constant cross section can be manufactured with this process. Local thick zones, partly optimized fiber angle or even modifications of the shape are not possible. For practical purposes, therefore, such structural elements often have to be provided with thick zones (for stiffening and/or subsequent force transmission) by laborious post-processing.

SUMMARY OF THE INVENTION

It is therefore an object of the present invention to provide a simple method for the production of fiber-composite structural elements, which method is also suitable in particular for the production of fiber-composite structural elements having complex geometry, such as profile sections with varying profile cross section and/or with curved shape in at least some portions.

This object is achieved according to the invention by a method for production of fiber-composite structural elements comprising the steps of:

a) providing a plurality of core parts,
b) separately applying a first fiber material on each of the core parts,
c) joining the core parts lined with the first fiber material to one another to form a core-part row,
d) applying a second fiber material common to the core-part row along at least one side of the core-part row on which the core parts are lined with the first fiber material,
e) infiltrating and curing the first and second fiber materials to form a fiber-reinforced structural-element block, and
f) subdividing the structural-element block into a plurality of portions, which represent the fiber-composite structural elements.

With this method it is possible in simple manner to produce even fiber-composite structural elements of complex shape, especially, for example, even elongated curved profiled structural elements with irregular radius of curvature. A particular advantage of the invention is that a plurality of fiber-composite structural elements, especially a plurality of identical fiber-composite structural elements, can be produced simultaneously and therefore inexpensively with the method ("package manufacture"). In this respect, the simultaneous production of at least three, especially at least five or even at least ten structural elements is preferred.

In principle, the inventive method is not subject to any special restrictions on the type of fiber material to be used (such as individual fibers, rovings, flat semifinished fiber products, etc.) or on the type of matrix material to be used. In one embodiment, the use of carbon fibers is provided. Alternatively or additionally, however, it is possible without difficulty to use even other fibers, such as glass fibers, synthetic plastic fibers, steel fibers or natural fibers. Interesting in particular as matrix materials are plastics, such as thermosetting plastics (synthetic resins). However, the items in these lists are to be understood only as examples. Moreover, fillers or additives may be incorporated in ways known in themselves if necessary.

The terms "first fiber material" and "second fiber material" used here are intended to convey the fact that fiber material is used in two stages in the inventive method, namely first in step b), in which a fiber material is applied separately on each of the core parts, and later in step d), in which a fiber material is applied on the previously formed core-part row. These terms are not intended to give the impression that the first fiber material must be different from the second fiber material. This can indeed be provided, but is by no means imperative. In this sense, it is also possible to use a plurality of different first fiber materials in step b) and/or a plurality of different second fiber materials in step d). The term "application" (of the fiber material in question) is to be understood very broadly within the scope of the invention. As an example, individual fibers can be applied by a circular braiding or wrapping process. Alternatively or additionally, application may also take place by laying (especially in the case of a flat semifinished textile product), fixed if necessary by an adhesive layer.

In a preferred embodiment, the core parts are formed as profiled parts, whose profile cross section varies over the longitudinal extent of the profile and/or whose longitudinal extent of the profile has curved shape in at least portions. Since the core parts being used define the shape for the manufactured structural elements, it is therefore possible to produce, with this measure, profiled structural elements wherein the profile cross section varies over the longitudinal extent of the profile and/or wherein the longitudinal extent of the profile has curved shape (including "kinked" shape) in at least portions. In a preferred embodiment, the produced profiled structural elements are elongated, and in particular the longitudinal extent of the profile is larger by a factor of at least 5, especially by a factor of at least 10 than the maximum longitudinal extent of the profile.

To produce a plurality of elongated profiled structural elements, it is possible to provide, in step a) for example, a plurality of identical elongated profiled core parts, which, after application of the fiber material in step b), are joined to one another along their longitudinal sides to form a core-part row, before the fiber material common to the core-part row is applied in step d), for example by being laid. The core-part row then has a length that corresponds to the length of the individual profiled core parts and a width that corresponds to the sum of the widths of the individual profiled core parts plus the thicknesses of the fiber material in the direction in which the core parts are joined to one another or arranged in a row.

The core parts used in the method can be provided as reusable or non-reusable parts. In the case of reusable core parts, which may be made of metal (such as aluminum), for example, it is merely necessary to ensure that these are not damaged while the structural-element block is being subdivided in step f), if at that time the core parts are still located inside the structural-element block. Non-reusable core parts can be formed in simple manner, for example from plastic, especially foamed plastic, and can be cut apart from one another and therefore destroyed if necessary during subdivision of the structural-element block.

In one embodiment it is provided that the core parts have at least one local recess, which is filled with fiber material in step b). In this way local thick zones for the finished structural element can be created in simple manner. An alternative or additional possibility is to form such local thick zones by laying the first fiber material in step b) and/or the second fiber material in step d) in a thickness that is greater at one or more locations.

If necessary, local thick zones can be formed by a special material, such as fiber material, which may be different from the first fiber material and/or the second fiber material. If the core part is provided with one or more of the aforesaid local recesses for this purpose, it is possible, for example, to lay one or more cut-to-size pieces of a semifinished textile product in each of these recesses (integration of reinforcing plies). In a more special embodiment, it is provided that a local recess at the surface of the core part in question is filled to level condition and subsequently completely covered during application of the first fiber material.

In a preferred embodiment it is provided that the application of the first fiber material in step b) comprises circular braiding and/or wrapping of the individual core parts. This method of applying the first fiber material can be automated very readily, for example by using a method or an apparatus such as described in German Unexamined Patent Application DE 102004017311 A1 (for the production of semifinished fiber-composite products). Accordingly, the application of the first fiber material in step b) can be accomplished in particular by means of circular braiding techniques, wherein the core part in question is braided with braiding threads wound over lace bobbins revolving concentrically in different directions around the core part. In this case it can be provided in particular that the lace bobbins of one direction of revolution are filled with reinforcing threads and the lace bobbins of the opposite direction of revolution are filled at least partly with support threads, which are able to hold the reinforcing threads in position and which can consist at least partly of thermoplastic threads. In a preferred improvement, the core part is braided several times, in each case by laying unidirectional individual plies of the first fiber material onto the core part. By virtue of automated application of the first fiber material by a circular braiding technique, it is advantageously possible to achieve high reproducibility and well-defined fiber orientation (unidirectional or multidirectional). Moreover, additional strips of fiber material can be interposed in simple manner during the circular braiding process. In a preferred embodiment of circular braiding, an even braid, or in other words a non-wavy braid, is formed.

The local thick zones explained in the foregoing can be formed directly during circular braiding and/or wrapping as early as step b), or else they can be formed by locally repeated circular braiding or wrapping processes or even by flat semifinished fiber-material products (cut-to-size pieces, strips, etc.) to be additionally inserted.

In principle, another conceivable alternative to circular braiding or wrapping in step b) is in particular draping of fiber-material plies, although this usually involves considerably more manual labor in practice. In one embodiment, it is therefore provided that a large part of the first fiber material will be laid on the core part in question by circular braiding or wrapping, while if need be a smaller proportion of the first fiber material is laid in the form of a flat semifinished fiber composite, which if necessary is cut to size. The latter application of a ply of fiber material may be accompanied in particular (before and/or after) by circular braiding or wrapping.

In one embodiment it is provided that the core parts lined and joined together are fixed in step c) by means of a holding device, which is part of an infiltration unit used for step e). The infiltration unit can in turn be part of a mold, in which both infiltration of the fiber material with the matrix material in question and at least partial curing of the fiber-matrix composite are performed. Depending on the number of pieces of fiber-composite structural elements to be produced, either an open mold or a closed mold may be used during joining together (stacking) of the lined core parts and/or during application of the second fiber material (for example, cover plies of multiaxial nonwoven fabrics, woven fabrics, etc. on one or two sides) and/or during infiltration or curing.

In a preferred embodiment it is provided that the application of the second fiber material in step d) comprises the application of at least one sheet-like ply of fiber material (such as semifinished textile), which may be in particular a cut-to-size piece or strip of multiaxial nonwoven fabric, woven fabric or similar material.

The second fiber material may be laid if necessary on both sides of the core-part row, using the same or different material type and the same or different material thickness (and also in a plurality of layers).

The infiltration and curing provided in step e) can be advantageously achieved with all methods known in themselves from fiber-composite manufacturing practice (such as VAP, RTM, etc.). In the case of infiltration with an epoxy resin, it is possible to achieve curing thermally, for example, in a temperature range from room temperature to approximately 180° C., depending on the nature of the resin.

In one embodiment it is provided that the structural-element block is subdivided in step f) by a plurality of parting cuts that take place respectively in the region of one of the core parts, wherein each parting cut causes the fiber material (and possibly the core part) adjoining the core part in question to be split and thus associated with several of the resulting fiber-composite structural elements.

Core parts not scheduled for reuse (such as foamed-material cores) may be destroyed if necessary during removal from the mold.

The fiber-composite structural elements formed by subdivision of the structural-element block in step f) may be post-machined if necessary before being used.

The invention will be described further hereinafter on the basis of exemplary embodiments with reference to the attached drawings, wherein:

DETAILED DESCRIPTION OF THE PREFERRED EMBODIMENTS

Figure 1:
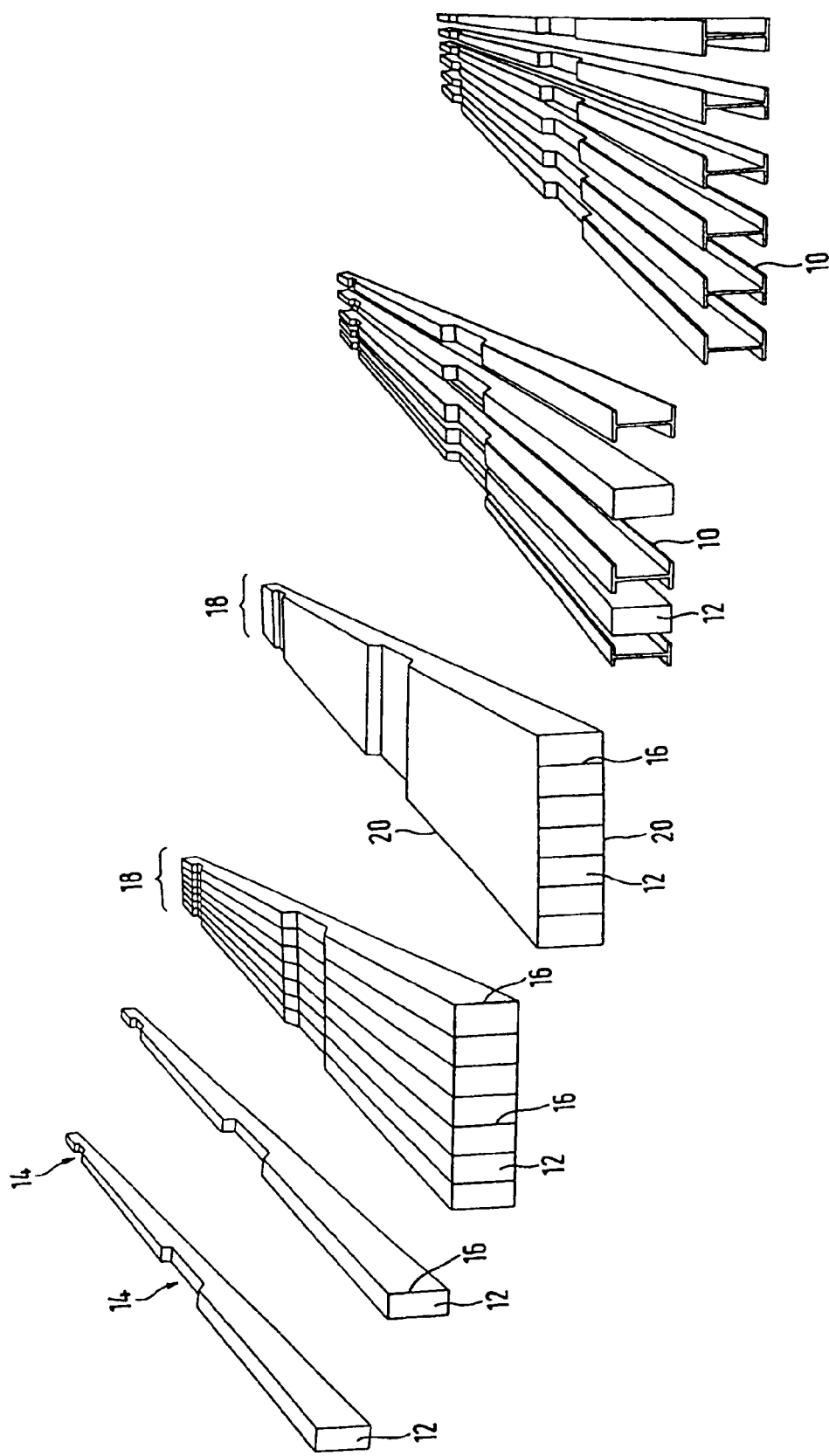
FIG. 1 shows a diagram for illustration of the production of a plurality of fiber-reinforced profile sections, wherein the profile cross section varies over the longitudinal extent of the profile.

FIG. 1 illustrates, from left to right, various stages during the simultaneous production of six fiber-composite structural elements 10 in the form of I-beam sections (see extreme right in FIG. 1).

Figure 7:
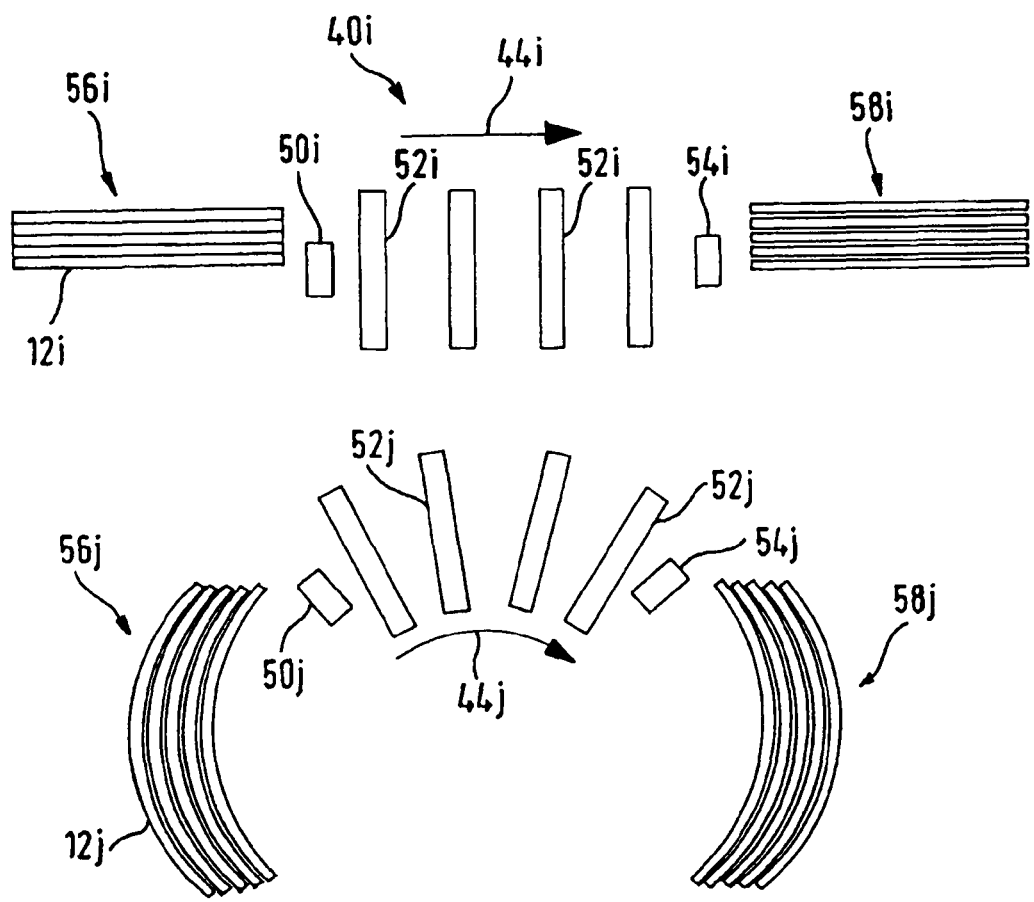
FIG. 7 shows a schematic diagram of the application of a multiaxial fiber material on individual core parts, on the one hand for core parts with rectilinear extent and on the other hand for core parts with curved extent.

This "package manufacture" of profile sections 10, which will be subsequently usable as crossbeams in the floor of an aircraft fuselage, for example, comprises the following steps:

a) Firstly there are provided core parts 12 of the type illustrated at the extreme left in FIG. 1 (in FIG. 7 there are illustrated seven such core parts, which in the illustrated exemplary embodiment are formed as core-part profile sections, which are elongated in one direction and whose profile cross section varies over the longitudinal extent of the profile). In the illustrated example the profile cross section is rectangular, with visible indentations 14, where the cross-sectional area is correspondingly reduced, at two positions along the extent of the profile. As an example, core parts 12 can be produced by milling a commercial hard foamed material or else a metal material. Their nature is of secondary importance, since they are used only as shaping aids in the production of the actual structural elements 10.

b) In the next step, a first fiber material 16 is applied separately on each of core parts 12. In the illustrated exemplary embodiment, this step comprises circular braiding of core parts 12 with the fiber material. In view of the subsequent use of structural elements 10, a favorable fiber orientation (or plurality of fiber orientations) can be provided in a manner known in itself for this purpose. Such core parts 12 are used as "braided cores".

c) Core parts 12 lined with first fiber material 16 are then joined to one another to form a core-part row 18. In the illustrated exemplary embodiment, each two immediately neighboring core parts 12 enveloped with fiber material 16 (completely, except for the end faces) are in contact along a plane boundary face, so that the individual lined core parts 12 bear against one another with their entire surface as viewed in stacking direction.

d) A second fiber material 20 is then applied along at least one side of core-part row 18. In the illustrated exemplary embodiment, this fiber material 20 is applied both on the bottom side and top side of illustrated core-part row 18.

e) The structure created in this way and comprising shaping core parts 12 lined up against one another and also fiber materials 16, 20 is then infiltrated with a suitable matrix material (such as epoxy resin) and thermally cured. In a preferred embodiment, the curable matrix material is added by using a vacuum infusion process, for example by means of a standard infusion process such as VAP, VARI, etc. For this purpose it is possible to use, for example, an infiltration system with membrane structure, wherein appropriate inlets and outlets for a resin matrix are provided in a covering film and/or in a mold. Such a vacuum system may also be used if necessary for compaction of core-part row 18 lined with fiber material. When the lined core-part row is covered with an airtight film and then the space under the film is more or less evacuated, the system is subjected to the atmospheric ambient pressure. Alternatively or in addition to evacuation of the space bounded by the film, an elevated ambient pressure may be applied, for example by introducing lined core-part row 18 together with film in an autoclave. Complete curing or even only partial curing may be provided in this step.

f) Finally, the structural-element block created in the previous step by infiltration and curing is subdivided into a plurality of portions, which (after final post-machining if necessary) represent fiber-composite structural elements 10. In general, depending on the geometry of core parts 12 and the thickness of the binding of fiber material at the surface of core parts 12, it will not be possible to remove these core parts before the structural-element block is subdivided. In one embodiment, it is therefore provided that both fiber material 16, 20 and also core parts 12 will be severed by parting cuts (core parts 12 not reusable). In another embodiment, it is provided that parting cuts will be made in such a way that only fiber material 16, 20 is severed thereby and that core parts 12 released as a result are reusable.

By means of the described production method, six fiber-reinforced I-beams 10 are produced simultaneously by using seven core parts 12, in the manner illustrated in FIG. 1. In this case, the structural-element block is subdivided by seven parting cuts (vertical in FIG. 1), each passing through the region of one of core parts 12, wherein each parting cut causes fiber material 16, 20 adjoining core part 12 in question to be split and thus associated with several of the resulting fiber-composite structural elements 10.

In a deviation from the illustrated exemplary embodiment, individual beams 10 could be endowed in simple manner with an approximate C-shaped profile, by positioning the planes of the vertical parting cuts somewhat offset relative to the illustrated exemplary embodiment (by approximately half the width of a core part 12).

Starting from the structural-element block illustrated in FIG. 1, it would also be possible to produce (twice as many) T-beams or L-beams, for example, by the subdivision step, for example by providing a horizontal parting cut in addition to the vertical parting cuts.

As an example, the I-beams or C-beams originally obtained by separating the structural-element block are each split one more time horizontally.

In the exemplary embodiment according to FIG. 1, core parts 12 are each elongated and have identical shape, and the longitudinal extent of their profile is rectilinear (and orthogonal to the subsequent stacking direction). However, the profile cross section varies over the longitudinal extent of the profile (see indentations 14). Profiled core parts 12 are arranged with identical orientation in core-part stack 18.

In the description hereinafter of further exemplary embodiments, like reference numerals are used for components having like effect, but in each case they are supplemented by a lower-case letter to distinguish the embodiment. Thus substantially only the differences relative to the already described exemplary embodiment or embodiments will be pointed out and otherwise the description of the preceding exemplary embodiments will be expressly applicable by reference.

Figure 2:
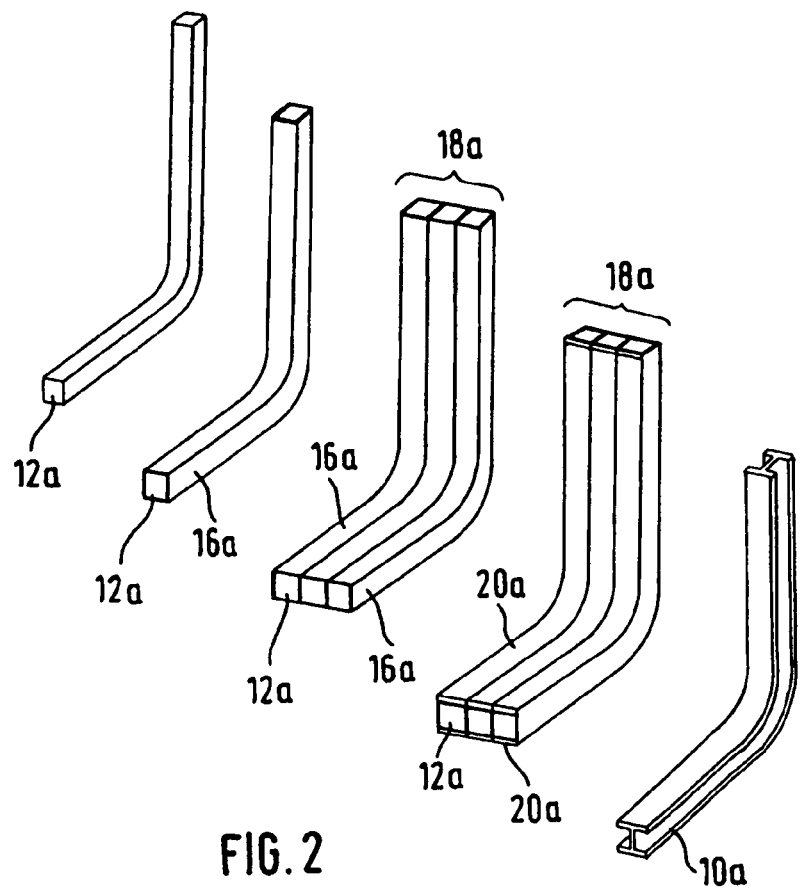
FIG. 2 shows a diagram for illustration of the production of a plurality of fiber-reinforced profile sections, wherein the longitudinal extent of the profile has a curved shape.
Figure 3:
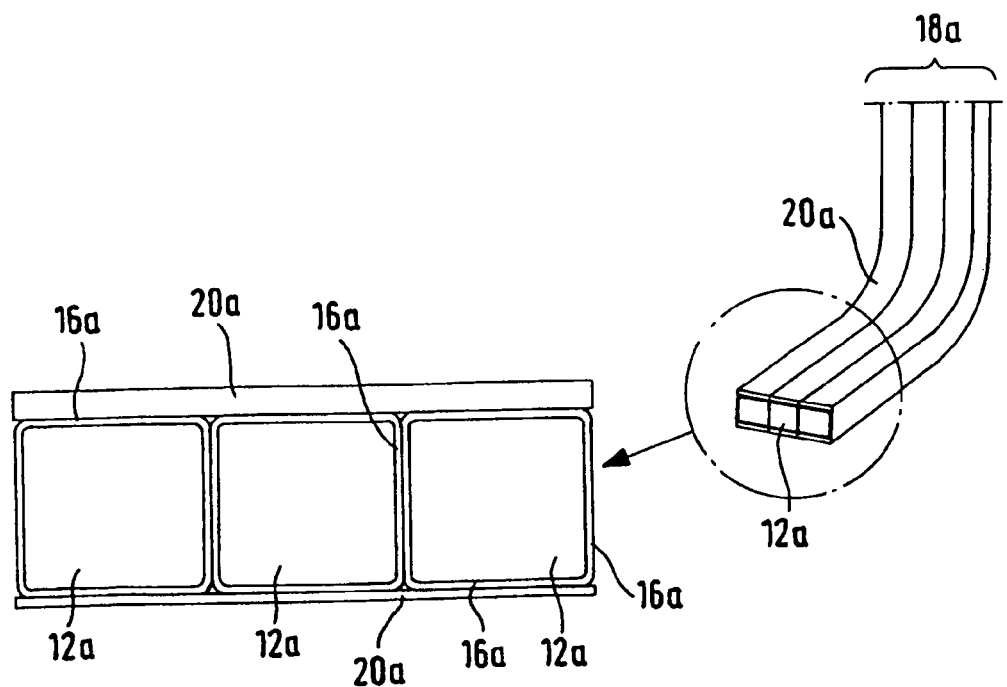
FIG. 3 shows a detail from FIG. 2.

FIGS. 2 and 3 illustrate an exemplary embodiment of a method for simultaneous production of a plurality of fiber-composite structural elements, which are again formed as I-beam sections as in the example described hereinabove with reference to FIG. 1. In a deviation from the foregoing example, however, the longitudinal extent of the produced profiled structural elements has curved shape.

In a diagram similar to FIG. 1, FIG. 2 shows, at the extreme left, a core part 12a, which is again provided several times in identical form for the method described hereinafter. Further to the right in FIG. 2 there are again illustrated further intermediate production stages, namely a core part 12a lined (for example, wrapped) with a first fiber material 16a, a core-part row 18a formed by joining core parts 12a lined with the first fiber material 16a to one another, core-part row 18a lined additionally on its bottom side and top side with a second fiber material 20a, and a fiber-composite structural element 10a obtained after infiltration, curing and subdivision of the structural-element block.

FIG. 3 once more illustrates, in an enlarged detail diagram, the arrangement of fiber materials 16a, 20a along the longitudinal sides of core-part row 18a. As an example, it is shown that fiber-material layers 20a on the two opposite flat sides (top side and bottom side) of core-part row 18a may also have different material thicknesses. Such different layer thicknesses of second fiber material 20a as well as the ratio of these layer thicknesses to the layer thickness of first fiber material 16a can be advantageously adapted to the mechanical stresses expected on finished structural element 10a. In this respect it is also favorable under some circumstances to provide—viewed in the section plane of FIG. 3 and/or viewed in longitudinal direction of the core-part row—a non-uniform thicknesses and/or a non-uniform material for at least one of fiber materials 16a, 20a, thus deviating from the illustrated exemplary embodiment.

The parting cuts made at the end of the production process in order to separate structural elements 10a (into a plurality of I-beam sections) are indicated by broken lines in FIG. 3.

Figure 4:
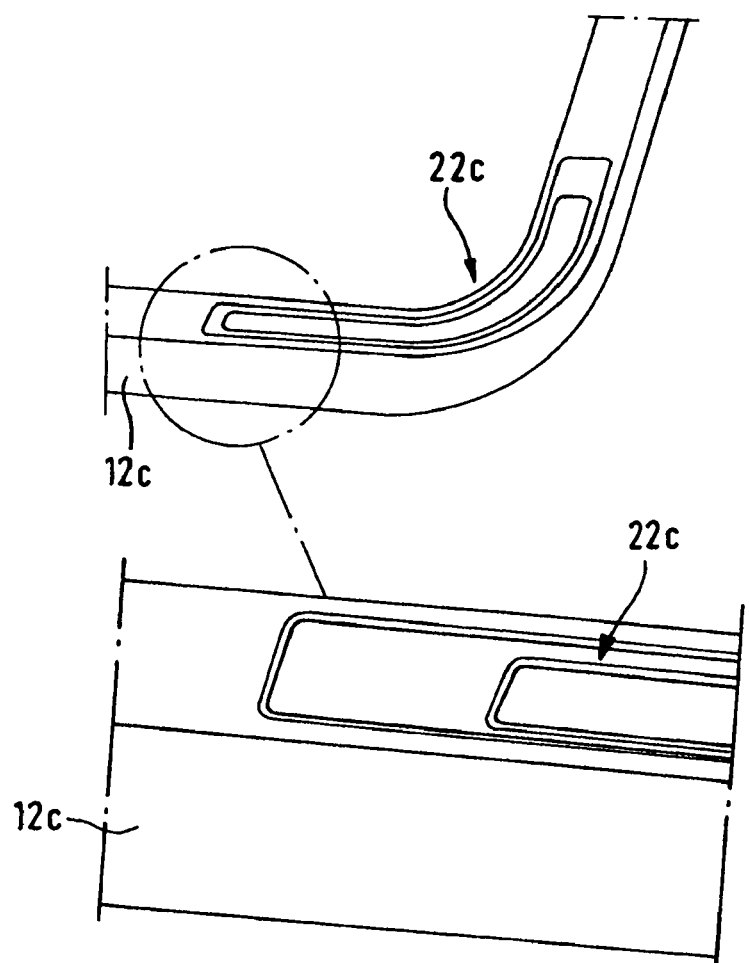
FIG. 4 shows a perspective view of a core part according to a further embodiment.

FIG. 4 is a detail diagram for illustration of the manner in which local thick zones can be created on the finished fiber-composite structural element in a production method of the type explained in the foregoing.

At the top of FIG. 4 there is illustrated a portion of a core part 12c used in the production method and having a stepped recess 22c in a curved portion. Otherwise core part 12c has, for example, a rectangular cross-sectional contour.

In this exemplary embodiment it is provided that, during laying of a first fiber material on each of core parts 12c, recess 22c is first filled completely with "additional first fiber material" before core part 12c is also lined (for example wrapped and/or circularly braided) with first fiber material in the regions adjacent to recess 22c. Thus a local thick zone, which is "inwardly directed", so to speak, is produced in the region of recess 22c of the finished structural element (not illustrated). Alternatively or additionally, it would obviously also be possible to provide "outwardly" directed thick zones, by forming corresponding thick zones during application of the first fiber material.

The fiber material to be introduced into the illustrated recess 22c could be composed, for example, of two cut-to-size pieces of a fiber mat laid successively (into the two illustrated recess regions).

The provision of recess 22c in a curved portion of core part 12c in order to form a reinforcement on the finished structural element is usually advantageous from the practical viewpoint, because structural elements of the type of interest here are usually subjected to greater stresses in the curved portions.

The special feature illustrated in FIG. 4, namely the formation of one or more local recesses for integration of additional fiber material, can be provided without difficulty for each of the exemplary embodiments described in the foregoing in connection with FIG. 1 or FIGS. 2 and 3 (or for a combination thereof).

A special advantage of the thick zone created by a recess of the core part being used is that the first fiber material additionally applied locally on the core part does not interfere with formation of a core-part row of core parts abutting one another with their entire surface even if the recess is oriented "in stacking direction", or in other words is facing a neighboring core part in the core-part row. On the other hand, in the case of creation of local thick zones by "fiber material protruding outwardly on the core part", it is usually advisable to produce additional fiber material on a side of the core part that is not directly facing a neighboring core part in the core-part row. In core-part rows 18 or 18a illustrated in FIGS. 1 and 2, these are the top sides and bottom sides of the core-part row in question.

As regards the preferred use of the fiber-composite structural elements as a structural member in aircraft construction, local thick zones may be particularly expedient, especially in portions of a profiled structural element that are curved or have reduced contour area.

As already explained, the described production method is suitable in particular for "package manufacture" of a plurality of identical fiber-composite structural elements, which resemble profiled sections on the whole but in which the profile cross section varies over the longitudinal extent of the profile and/or the longitudinal extent of the profile is curved in one or more regions.

Figure 5:
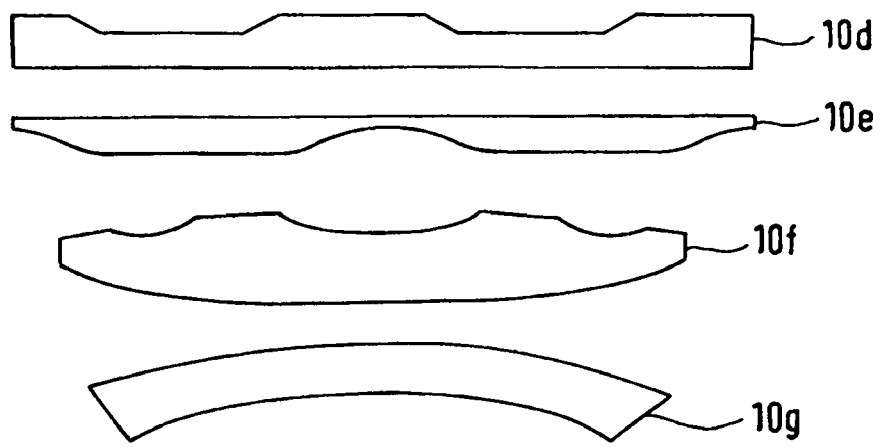
FIG. 5 shows a diagram for illustration of examples of the geometries of several core-parts or fiber-composite structural elements.

FIG. 5 shows longitudinal sections through several fiber-composite structural elements 10d, 10e, 10f and 10g that can be produced with the described method. Obviously the illustrated longitudinal-section shapes are to be understood merely as examples and are intended to illustrate the great flexibility of the method as regards the geometry of the fiber-composite structural elements that can be produced.

Many working steps in the described method can be advantageously performed in at least partly automated manner. This will be illustrated hereinafter with reference to FIGS. 6 and 7, taking the step of separate laying of the first fiber material on each of the plurality of core parts as an example.

Figure 6:
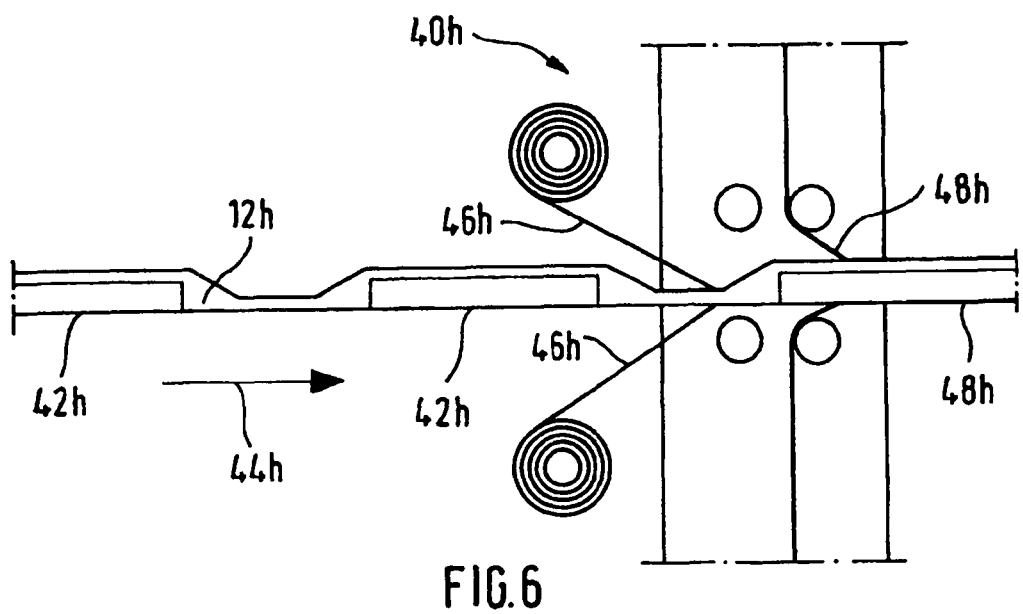
FIG. 6 shows a schematic diagram of the automated application of a fiber material on a core part.

FIG. 6 schematically shows an apparatus 40h, by means of which part of the first fiber material to be laid on a core part 12h in step b) is applied in automated manner.

Each core part 12h is first provided on portions of two opposite longitudinal sides with cut-to-size pieces 42h of a semifinished textile product (such as cut-to-size pieces glued on in the manner of labels).

Core part 12h already provided in portions with the first fiber material (cut-to-size piece 42h) is then conveyed in the direction of arrow 44h lengthwise through apparatus 40h. In the process, the opposite top and bottom sides of core part 12h shown in FIG. 6 are each provided with a continuous strip 46h of fiber material (such as semifinished textile product), which is unwound from respective supply rolls. Finally, an enveloping fiber-material layer 48h is formed by apparatus 40h, also in automated manner, by circular braiding in the illustrated exemplary embodiment.

Several of these core parts 12h lined with first fiber material 42h, 46h and 48h are then joined to one another to form a core-part row, and are lined with a second fiber material common to all core parts, as already described in the foregoing examples according to FIG. 1 or FIGS. 2 and 3. Moreover, the second fiber material can also be laid (not illustrated) in automated manner.

The factors important for the mechanical characteristics of the fiber-composite structural elements produced by using apparatus 40h include the layer thickness and fiber orientation of the individual fiber materials, in this case fiber materials 42h, 46h and 48h. In an improvement of the enveloping method illustrated in FIG. 6, there is provided an apparatus having a plurality of circular braiding stations disposed in succession in the direction of travel of the core part. Such an improvement will be described hereinafter with reference to FIG. 7.

At the top of FIG. 7 there is schematically illustrated an apparatus 40i, which comprises a core-feed unit 50i, a plurality (four in this case) of coating stations (such as circular braiding units, and possibly also including devices for integration of additional fiber materials) 52i and one cutting unit 54i for severing the fiber material.

A stock of core parts 12i to be conveyed successively through apparatus 40i is denoted by 56i. After coating of core parts 12i by means of apparatus 40i, a stock 58i of core parts lined with fiber material is obtained. In this example, the circular braiding stations apply circular braiding having different fiber orientations (such as +45°, −45°, −45°, +45°) around core parts 12i.

At the bottom of FIG. 7 there is illustrated a slightly modified apparatus 40j, in which the individual processing stations 50j, 52j and 54j are disposed along a curved path 44j. This processing path is chosen such that it is adapted to the curved shape of core parts 12j to be coated.

The invention claimed is:

1. A method for production of a plurality of fiber-composite structural elements, comprising:
   a) providing a plurality of core parts, wherein the core parts each have at least one local recess;
   b) separately applying a first fiber material on each of the core parts, said separately applying comprising filling said at least one local recess with said first fiber material and subsequently completely covering said at least one local recess with said first fiber material thereby forming on each core part a reinforced portion located at said at least one local recess;
   c) joining the core parts lined with the first fiber material to one another to form a core-part row;
   d) applying a second fiber material common to the core-part row along at least one side of the core-part row on which the core parts are lined with the first fiber material;
   e) infiltrating and curing the first and second fiber materials to form a fiber-reinforced structural-element block; and
   f) subdividing the structural-element block into a plurality of portions, which represent the plurality of fiber-composite structural elements, wherein subdivision takes place by a plurality of parting cuts, each passing through the region of one of the core parts, wherein each parting cut causes the fiber material adjoining the core part in question to be split and thus associated with several of the resulting fiber-composite structural elements.

2. A method according to claim 1, wherein the core parts are formed as profiled parts, whose profile cross section varies over the longitudinal extent of the profile and/or whose longitudinal extent of the profile has curved shape in at least portions.

3. A method according to claim 1, wherein identical core parts are provided in the providing a).

4. A method according to claim 1, wherein the applying of the first fiber material in the separately applying b) comprises circular braiding and/or wrapping of the individual core parts.

5. A method according to claim 1, wherein the core parts lined and joined together are fixed in the joining c) by a holding device, which is part of an infiltration unit used for the infiltrating and curing e).

6. A method according to claim 1, wherein the applying of the second fiber material in the applying d) comprises application of at least one sheet-like ply of fiber material.

7. A method according to claim 1, wherein said filling of said at least one local recess comprises laying at least one cut-to-size piece of a semifinished textile product.

8. A method according to claim 1, wherein said filling of said at least one local recess comprises laying a plurality of cut-to-size pieces of a semifinished textile product.

9. A method according to claim 1, further comprising forming stepped recesses for providing said at least one local recess.

10. A method according to claim 1, wherein said at least one local recess faces an abutting core part in said core-part row, and wherein said reinforced portion, being inwardly directed, does not interfere with forming said core-part row.

* * * * *